(12) United States Patent
Cha et al.

(10) Patent No.: US 10,079,095 B2
(45) Date of Patent: Sep. 18, 2018

(54) CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventors: Kyoung Jin Cha, Suwon-si (KR); Seung Ho Lee, Suwon-si (KR); Seung Heui Lee, Suwon-si (KR); Min Gon Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 17 days.

(21) Appl. No.: 15/202,145

(22) Filed: Jul. 5, 2016

(65) Prior Publication Data

US 2017/0169947 A1    Jun. 15, 2017

(30) Foreign Application Priority Data

Dec. 15, 2015 (KR) .................. 10-2015-0179223

(51) Int. Cl.
*H01G 4/018* (2006.01)
*H01G 4/008* (2006.01)
*H01G 4/12* (2006.01)
*H01G 4/30* (2006.01)
*H01G 4/012* (2006.01)

(52) U.S. Cl.
CPC ............. *H01G 4/018* (2013.01); *H01G 4/008* (2013.01); *H01G 4/012* (2013.01); *H01G 4/12* (2013.01); *H01G 4/1227* (2013.01); *H01G 4/30* (2013.01); *H01G 4/308* (2013.01)

(58) Field of Classification Search
None
See application file for complete search history.

(56) References Cited

U.S. PATENT DOCUMENTS

| 5,111,356 A * | 5/1992 | Hardy | C04B 41/5194 |
| | | | 310/358 |
| 2011/0247186 A1* | 10/2011 | Yu | H01G 4/012 |
| | | | 29/25.42 |
| 2012/0307417 A1* | 12/2012 | Kim | H01G 4/30 |
| | | | 361/321.2 |
| 2013/0002388 A1* | 1/2013 | Kim | H01G 4/30 |
| | | | 336/200 |
| 2013/0135789 A1* | 5/2013 | Kim | H01G 4/12 |
| | | | 361/321.2 |

(Continued)

FOREIGN PATENT DOCUMENTS

| JP | 7-45473 A | 2/1995 |
| KR | 10-2015-0084934 A | 7/2015 |

*Primary Examiner* — Dion R Ferguson
(74) *Attorney, Agent, or Firm* — McDermott Will & Emery LLP (57) ABSTRACT

A capacitor includes a body including a plurality of dielectric layers and internal electrodes which are alternately stacked, and a compensation region formed in the interior of the body, the compensation region including portions of the plurality of dielectric layers and including a central portion and an end portion extended from the central portion. A thickness of the central portion of the compensation region is between 4 and 13 times as great as that of a dielectric layer among the plurality of dielectric layers on which the internal electrodes are formed.

16 Claims, 4 Drawing Sheets

(56) References Cited

U.S. PATENT DOCUMENTS

| | | | |
|---|---|---|---|
| 2014/0022690 A1* | 1/2014 | Kim | H01G 4/30 361/301.4 |
| 2014/0071586 A1* | 3/2014 | Park | H01G 4/12 361/301.4 |
| 2015/0116896 A1* | 4/2015 | Inazuka | H01G 4/1227 361/301.4 |
| 2015/0294792 A1 | 10/2015 | Schossmann et al. | |
| 2016/0099105 A1* | 4/2016 | Lee | H01G 2/065 174/260 |
| 2016/0247632 A1* | 8/2016 | Tsukida | H01G 4/232 |

\* cited by examiner

CAPACITOR AND METHOD OF MANUFACTURING THE SAME

CROSS-REFERENCE TO RELATED APPLICATION

This application claims the benefit of priority to Korean Patent Application No. 10-2015-0179223, filed on Dec. 15, 2015 with the Korean Intellectual Property Office, the entirety of which is incorporated herein by reference.

BACKGROUND

The present disclosure relates to a capacitor and a method of manufacturing the same.

Due to a difference in shape and height between an end portion and a central portion of an internal electrode pattern of a capacitor, a step portion may occur in the body of the capacitor having a high degree of lamination. As a result, stress may be accumulated during the lamination of a dielectric layer and an internal electrode pattern, and thus the dielectric layers may be thin at the portion of the body on which the accumulated stress is concentrated. The thinned dielectric layers may reduce the withstand voltage of the capacitor.

To solve the problem of the concentration of stress, methods of forming an internal electrode pattern using negative printing, low viscosity printing, printing using a metal mask and the like, have been proposed. However, such methods do not meet productivity and electrical characteristics requirements of capacitors.

Therefore, a method of securing withstand voltage characteristics of a capacitor by reducing step portions in the body of the capacitor has been required.

SUMMARY

Step portions may be formed in the body during the stacking of the internal electrode patterns and withstand voltage characteristics of the capacitor may be reduced.

An exemplary embodiment in the present disclosure reduces an amount of step portions in a body of a capacitor to secure withstand voltage characteristics of the capacitor.

According to an exemplary embodiment in the present disclosure, a capacitor comprises a body including a plurality of dielectric layers and internal electrodes which are alternately stacked, and a compensation region formed in the interior of the body, the compensation region including portions of the plurality of dielectric layers and including a central portion and an end portion extended from the central portion. A thickness of the central portion of the compensation region is between 4 and 13 times as great as that of a dielectric layer among the plurality of dielectric layers on which the internal electrodes are formed.

According to another exemplary embodiment in the present disclosure, a method of manufacturing a capacitor comprises the steps of: preparing a plurality of dielectric layers; forming internal electrode patterns on the plurality of dielectric layers; forming a compensation pattern between the plurality of dielectric layers formed with the internal electrode patterns; forming a laminate by stacking the plurality of dielectric layers and the compensation pattern; and forming a body including a compensation region by firing the laminate. A thickness of the central portion of the compensation region is between 4 and 13 times as great as that of a dielectric layer among the plurality of dielectric layers.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Hereinafter, a capacitor according to the present disclosure will be described.

Figure 1:
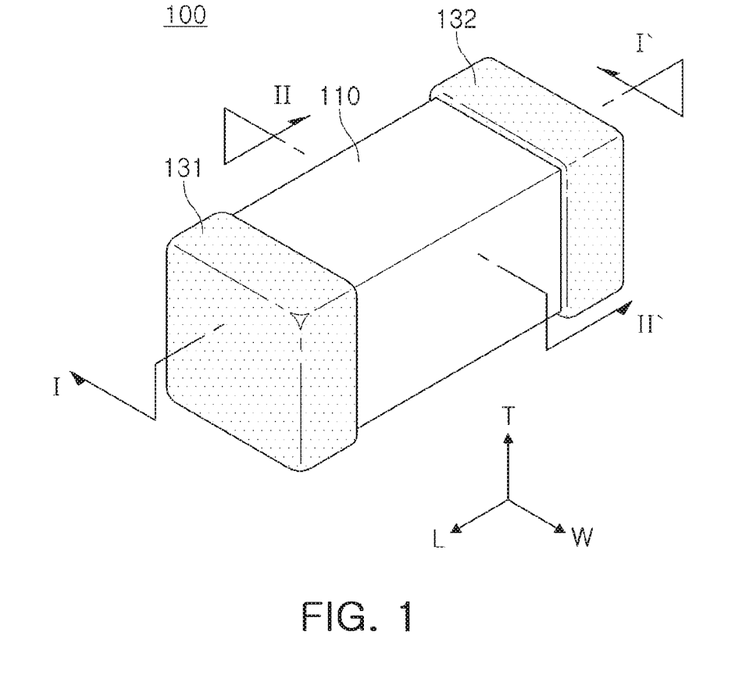
FIG. 1 is a perspective view schematically illustrating a capacitor according to an exemplary embodiment in the present disclosure.
Figure 2:
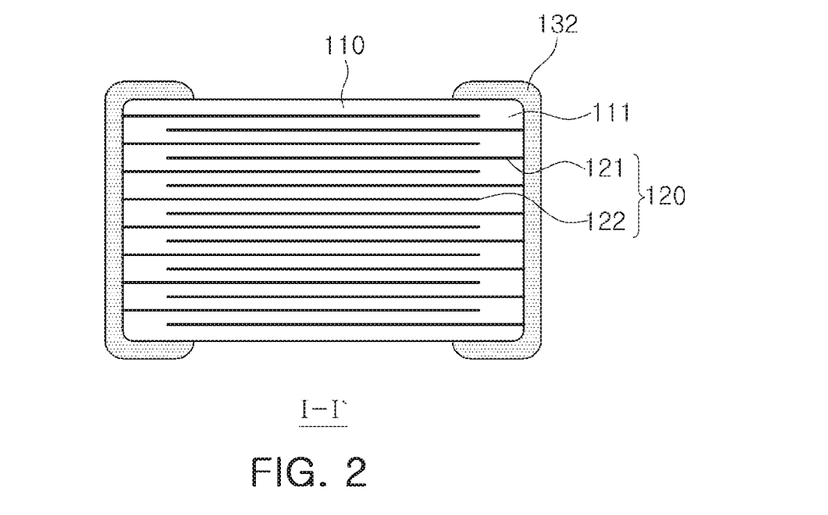
FIG. 2 is a schematic cross-sectional view of the capacitor according to the exemplary embodiment taken along line I-I' of FIG. 1.
Figure 3:
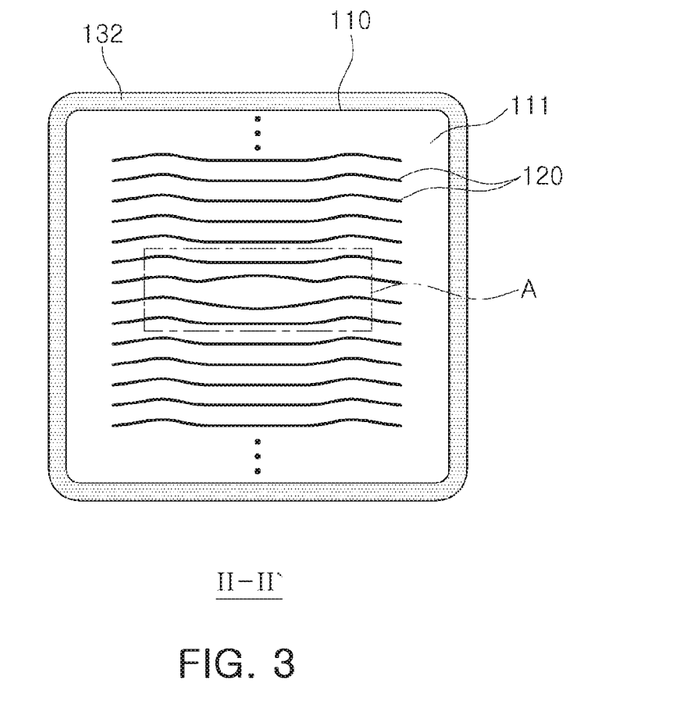
FIG. 3 is a schematic cross-sectional view of the capacitor according to the exemplary embodiment taken along line II-II' of FIG. 1.
Figure 4:
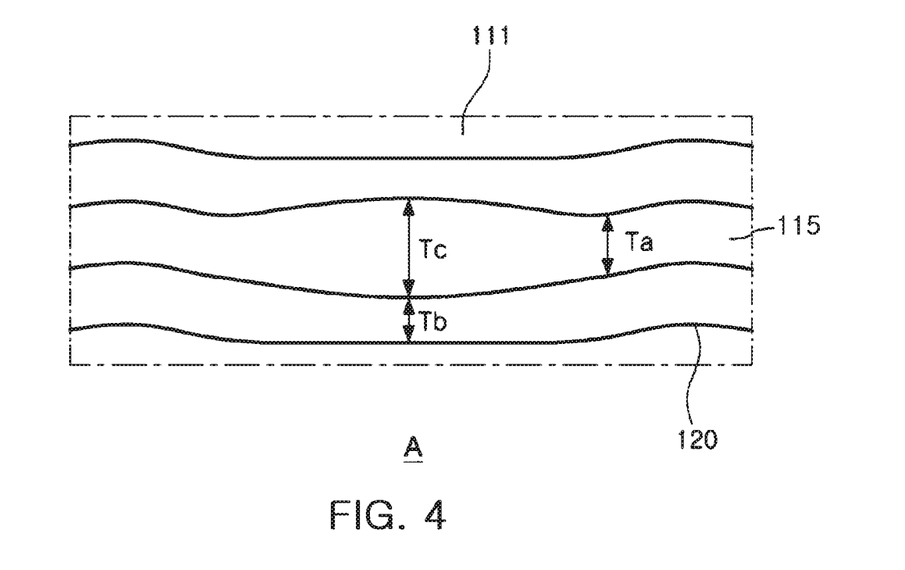
FIG. 4 is a schematic enlarged view of part A of FIG. 3.

FIG. 1 is a perspective view schematically illustrating a capacitor according to an exemplary embodiment in the present disclosure. FIG. 2 is a schematic cross-sectional view of the capacitor according to the exemplary embodiment taken along line I-I' of FIG. 1. FIG. 3 is a schematic cross-sectional view of the capacitor according to the exemplary embodiment taken along line II-II' of FIG. 1. FIG. 4 is a schematic enlarged view of part A of FIG. 3.

Referring to FIGS. 1 to 4, a capacitor 100 according to an exemplary embodiment includes a body 110 having a structure in which a plurality of dielectric layers 111 and internal electrodes 120 are alternately stacked, in which an interior of the body 110 may be provided with a compensation region 115 including portions of the dielectric layers and including a central portion and at least one end portion extended from the central portion. A thickness of the central portion of the compensation region may be between 4 and 13 times as great as that of a dielectric layer among the plurality of dielectric layers on which internal electrodes are formed.

The body 110 may be formed by stacking a plurality of dielectric layers 111.

The plurality of dielectric layers forming the body 110 may be in a sintered state, and adjacent dielectric layers may be integrated with each other so that boundaries therebetween may not be readily confirmed with the naked eye.

The dielectric layer 111 may include a ceramic material.

The ceramic material may include a perovskite material as a material having high permittivity. The perovskite material is not limited thereto but may be a barium titanate ($BaTiO_3$)-based material, a strontium titanate ($SrTiO_3$)-based material, or the like.

The body 110 may have the internal electrodes 120 formed therein.

The internal electrodes 120 may include first internal electrodes 121 having a first polarity and second internal electrodes 122 having a second polarity, and the first and second internal electrodes may be disposed to face each other, having at least one dielectric layer disposed therebetween.

The first and second internal electrodes 121 and 122 may be respectively exposed to opposite end surfaces of the capacitor to be electrically connected to the external electrodes 131 and 132, respectively.

The internal electrodes 120 may contain a conductive metal.

The conductive metal may be nickel (Ni), copper (Cu), palladium (Pd), or alloys thereof but is not limited thereto.

The external electrodes 131 and 132 may include a first external electrode 131 formed on a first end surface of the body 110 to be electrically connected to the first internal electrode 121 exposed to the first end surface of the body 110 and a second external electrode 132 formed on a second end surface thereof to be electrically connected to the second internal electrode 122 exposed to the second end surface thereof.

The external electrodes 131 and 132 may be respectively formed on opposite end surfaces of the body 110 to be connected to the first and second internal electrodes 121 and 122, respectively.

The external electrodes 131 and 132 may be extended to upper and lower surfaces and both side surfaces of the body 110 connecting between the first and second end surfaces of the body 110.

Therefore, the external electrodes 131 and 132 may be formed to enclose both end surfaces and portions of the upper and lower surfaces and the side surfaces of the body 110 while being connected to the internal electrodes exposed to the end surfaces of the body 110.

The first and second external electrodes 131 and 132 may be formed of a conductive paste containing a conductive metal.

The conductive metal may be nickel (Ni), copper (Cu), tin (Sn), or alloys thereof but is not limited thereto.

The conductive paste may further include an insulating material. For example, the insulating material may be glass.

As a method of forming the first and second external electrodes 131 and 132, the first and second external electrodes 131 and 132 may be formed by a method of applying an external electrode paste to the ceramic body, a plating method, or the like.

When an internal electrode pattern is used to form an internal electrode, there may be a disadvantage in that an end of the internal electrode pattern may be formed to be higher than a center of the internal electrode pattern on average. The end of the internal electrode pattern may be formed to be 1.3 to 1.4 times as large as the center, which may be a factor in concentrating stress on a specific portion of the body of the capacitor when the internal electrodes are stacked and compressed along with the plurality of dielectric layers.

In the capacitor, the portion of the body on which the stress is concentrated may be broken in a breakdown voltage (BDV) test.

The body 110 of the capacitor according to the exemplary embodiment in the present disclosure may thus include the compensation region 115. The compensation region 115 includes a central portion and an end portion extended from the central portion and a thickness Tc of the central portion of the compensation region is 4 to 13 times as large as a thickness Tb of the dielectric layer.

The body 110 may include the compensation region 115 to reduce the step portion in the body, thereby securing a withstand voltage of the capacitor. Furthermore, it is possible to secure productivity and electrical characteristics of the capacitor 100.

The body 110 may include a plurality of compensation regions 115.

A thickness Tc of the central portion of the compensation region 115 may be controlled, and therefore the problem of step portions may be solved regardless of the number of stacked dielectric layers.

When stacking the dielectric layers in an amount of several to several tens of layers is an active region (not illustrated), the compensation region 115 may be disposed between the active regions. The compensation region may be repeatedly dispersed between the active regions to reduce an amount of step portions in the body as much as possible, thereby improving the withstand voltage characteristics of the capacitor.

The central portion of the compensation region 115 may be disposed in the central portion of the body of the capacitor in the width direction of the body, above or below a central portion of the internal electrode.

The compensation region 115 may be formed of the same material as the dielectric layer 111. When the compensation region is formed of the same material as that of the dielectric layer, the step portion may be reduced and the strength of the capacitor may be secured.

The compensation region 115 included in the body 110 is in a sintered state along with the dielectric layer 111 and the adjacent dielectric layers may be integrated with each other so that a boundary between the dielectric layers adjacent to the compensation region may not be confirmed with the naked eye.

The compensation region 115 includes an end portion extended from the central portion of the compensation region to a vertical surface of the body 110 perpendicular to the stacking direction of the dielectric layer. That is, the compensation region includes the end portion extended from the central portion.

FIG. 4 is a schematic enlarged view of part A of FIG. 3.

Referring to FIG. 4, the thickness Tc of the central portion of the compensation region may be larger than the thickness Ta of the end portion of the compensation region. The thickness Tc of the central portion of the compensation region may be 2 to 7 times as large as the thickness Ta of the end portion of the compensation region. When the central portion of the compensation region is thicker than the end portion of the compensation region, the step portion due to the internal electrode may be reduced to secure the withstand voltage of the capacitor.

The thickness Ta of the end portion of the compensation region may be 1 to 2 times as great as the thickness Tb of the dielectric layer.

Hereinafter, a method of manufacturing a capacitor according to the present disclosure will be described.

Figure 5:
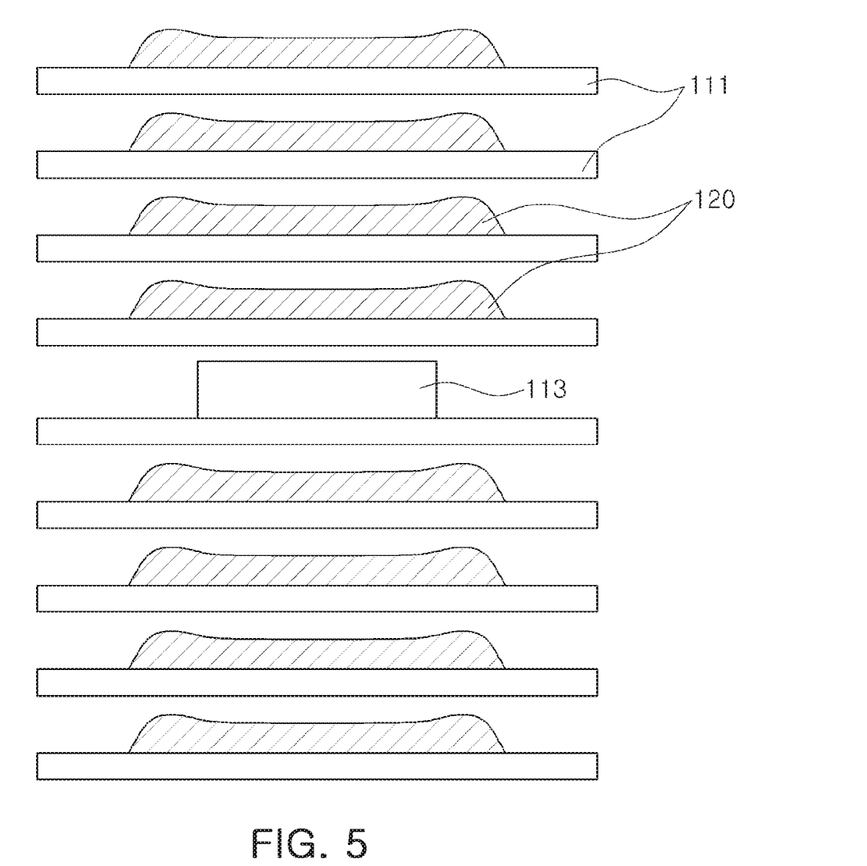
FIGS. 5 and 6 are diagrams schematically illustrating a manufacturing method of a capacitor according to an exemplary embodiment in the present disclosure.
Figure 6:
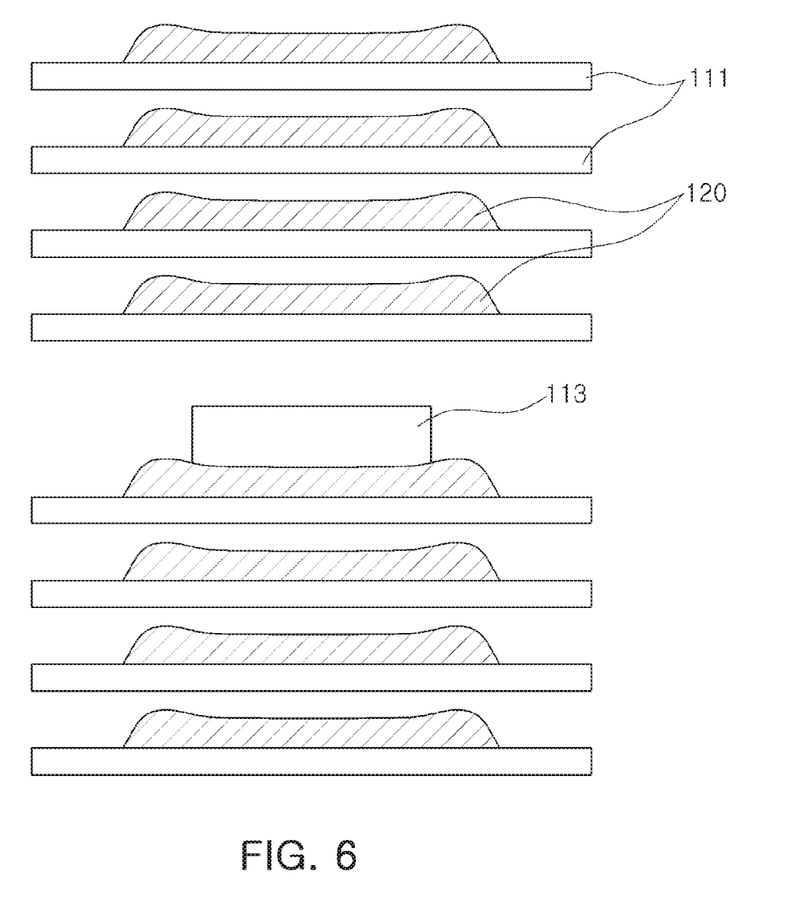

FIGS. 5 and 6 are diagrams schematically illustrating a manufacturing method of a capacitor according to an exemplary embodiment in the present disclosure.

A method of manufacturing a capacitor according to an exemplary embodiment in the present disclosure may include preparing a plurality of dielectric layers, forming internal electrode patterns on the plurality of dielectric layers, forming a compensation pattern between the plurality of dielectric layers provided with the internal electrode patterns, forming a laminate by stacking the plurality of dielectric layers and compensation patterns, and firing the laminate to form a body including the compensation regions, in which a thickness of the central portion of the compensation region may be 4 to 13 times as great as that of the dielectric layer.

First, the plurality of dielectric layers 111 are prepared.

The dielectric layer 111 may be formed of a slurry including a ceramic material, an organic solvent, and an organic binder.

The ceramic material may include a perovskite material as a material having high permittivity. The perovskite material is not limited thereto but may be a barium titanate ($BaTiO_3$)-based material, a strontium titanate ($SrTiO_3$)-based material, or the like.

Next, the internal electrode pattern 120 is formed on the dielectric layer 111.

The internal electrode pattern 120 may be formed by printing a conductive paste including conductive metal.

As the conductive metal, a material having excellent electrical conductivity may be used. For example, the conductive metal may include nickel (Ni), copper (Cu), palladium (Pd), or alloys thereof, but is not limited thereto.

The internal electrode pattern 120 may be printed on the dielectric layer 111 with conductive paste by a printing method, such as a screen printing method and a gravure printing method.

The body may be formed by alternately stacking and sintering the dielectric layers 111 printed with the internal electrode patterns 120.

The internal electrode pattern 120 may be formed so that the center of the internal electrode pattern 120 is thinner than the end by the printing process. As a result, a step portion may be formed in the body upon the stacking and compressing of the plurality of dielectric layers that may reduce the withstand voltage of the capacitor.

The present disclosure includes forming a compensation pattern 113 between the plurality of dielectric layers 111 formed with the internal electrode patterns 120. When the compensation pattern 113 is formed, the step portion formed in the body may be relieved in the following method.

The compensation pattern 113 may be disposed to be above or below a central portion of the internal electrode pattern.

The compensation pattern 113 may have a block shape. The compensation pattern may be formed in the block shape to effectively produce the capacitor, thereby increasing productivity.

The compensation pattern 113 may be formed of the same material as the dielectric layer 111. When the compensation region is formed of the same material as that of the dielectric layer 111, the step portion may be reduced and the strength of the capacitor may be secured.

The compensation pattern 113 may be formed by the printing method and may be formed of a dielectric material.

The thickness of the compensation pattern 113 may be 4 to 13 times as great as that of the dielectric layer.

The thickness of the compensation pattern 113 may be controlled, and therefore the problem of the step portion may be solved regardless of the number of stacked dielectric layers formed with the internal electrode patterns.

When several to tens of layers of the plurality of dielectric layers formed with the internal electrode patterns are the active regions, the compensation pattern 113 may be disposed between the active regions. The compensation pattern may be repeatedly dispersed between the active regions to reduce an amount of step portions in the body as much as possible, thereby improving the withstand voltage characteristics of the capacitor.

TABLE 1

| Division | Thickness of compensation pattern 1 layer/ thickness of dielectric layer 1 layer | Whether capacitance of capacitor is satisfied | Whether withstand voltage characteristics of capacitor are satisfied |
|---|---|---|---|
| 1* | 2 | X | ◎ |
| 2* | 3 | X | ◎ |
| 3 | 4 | ○ | ◎ |
| 4 | 5 | ○ | ◎ |
| 5 | 6 | ○ | ◎ |
| 6 | 7 | ○ | ◎ |
| 7 | 8 | ○ | ○ |
| 8 | 9 | ○ | ○ |
| 9 | 10 | ◎ | ○ |
| 10 | 11 | ◎ | ○ |
| 11 | 12 | ◎ | ○ |
| 12 | 13 | ◎ | ○ |
| 13* | 14 | ◎ | X |
| 14* | 15 | ◎ | X |

*Comparative Example
X: Not satisfactory,
○: Satisfactory,
◎: Highly satisfactory Table 1 shows whether the capacitance of the capacitor and the withstand voltage characteristics to be secured are satisfied, when the overall thickness of the compensation pattern formed in the laminate is the same and when one layer of the compensation pattern and one layer of the dielectric layer have different thicknesses.

When the thickness of the compensation pattern is twice and three times as large as the dielectric layer, it may be appreciated that the number of compensation patterns is excessively increased in the laminate and thus the capacitance of the capacitor is not satisfied.

When the thickness of the compensation pattern is 14 and 15 times as great as that of the dielectric layer, however, the number of compensation patterns in the laminate may be reduced but the thickness of the compensation pattern may be too thick. Therefore, it may be appreciated that the step portion due to the compensation pattern additionally occurs and thus the withstand voltage characteristics of the capacitor are not met.

Referring to FIG. 5, the compensation pattern 113 may be formed on the dielectric layer 111. The dielectric layer formed with the compensation pattern 113 may be interposed between the dielectric layers formed with the internal electrode patterns 120.

Referring to FIG. 6, according to another exemplary embodiment, the compensation pattern 113 may be formed on the internal electrode pattern.

The laminate may be formed by stacking the plurality of dielectric layers and the compensation pattern 113 and then the body including the compensation region may be formed by firing the laminate.

The total number of stacked dielectric layers 111 formed with the internal electrode patterns 120 may be variously determined in consideration of electrical characteristics such as a level of capacitance desired in the designed capacitor.

The compensation region may be formed of the compensation pattern and the dielectric layer contacting the compensation pattern.

The compensation region may include the central portion and at least one end portion extended from the central portion and the thickness of the central portion of the compensation region may be 4 to 13 times as great as that of the dielectric layer.

Next, although not shown, the external electrodes may be formed on both end surfaces of the body.

The external electrode may be formed by dipping the body in a paste for the external electrodes.

The paste for the external electrodes may include a conductive powder and the conductive powder may include a material including at least one of silver (Ag) and copper (Cu) or alloys thereof but is not limited thereto.

As set forth above, according to exemplary embodiments in the present disclosure, the capacitor may include the compensation region to reduce the step portion in the body, whereby the capacitance and the withstand voltage characteristics of the capacitor may be secured.

While exemplary embodiments have been shown and described above, it will be apparent to those skilled in the art that modifications and variations could be made without departing from the spirit and scope of the present disclosure as defined by the appended claims.

What is claimed is:

1. A capacitor, comprising:
a body including a plurality of dielectric layers and internal electrodes which are alternately stacked, and
a compensation region formed in the interior of the body, the compensation region including portions of the plurality of dielectric layers and including a central portion and an end portion extending from the central portion,
wherein a thickness of the central portion of the compensation region is greater than a thickness of the end portion of the compensation region,
wherein the end portion is located at an end portion of the compensation region, and
wherein the thickness of the central portion of the compensation region is 2 to 7 times as great as that of the end portion.

2. The capacitor of claim 1, wherein the thickness of the central portion of the compensation region is between 4 and 13 times as great as that of a dielectric layer among the plurality of dielectric layers on which the internal electrodes are formed.

3. The capacitor of claim 1, wherein the central portion of the compensation region is disposed on the central portion of the internal electrodes in the width direction of the body of the capacitor.

4. The capacitor of claim 1, wherein the compensation region is formed of the same material as the plurality of dielectric layers.

5. The capacitor of claim 1, wherein the body includes a plurality of compensation regions.

6. A capacitor, comprising:
a body including a plurality of dielectric layers and internal electrodes which are alternately stacked, and
a compensation region formed in the interior of the body, the compensation region including portions of the plurality of dielectric layers and including a central portion and an end portion extending from the central portion,
wherein the thickness of the end portion is between 1 and 2 times as great as that of a dielectric layer among the plurality of dielectric layers on which the internal electrodes are formed.

7. A method of manufacturing a capacitor, comprising the steps of:
preparing a plurality of dielectric layers;
forming internal electrode patterns on the plurality of dielectric layers;

forming a compensation pattern between the plurality of dielectric layers formed with the internal electrode patterns;

forming a laminate by stacking the plurality of dielectric layers and the compensation pattern; and forming a body including a compensation region by firing the laminate, wherein the compensation region includes a central portion and an end portion extending from the central portion, and wherein a thickness of the central portion of the compensation region is greater than a thickness of the end portion of the compensation region, wherein the end portion is located at an end portion of the compensation region, and wherein the thickness of the central portion of the compensation region is 2 to 7 times as great as that of the end portion.

8. The method of claim 7, wherein the thickness of the central portion of the compensation region is between 4 and 13 times as great as that of a dielectric layer among the plurality of dielectric layers.

9. The method of claim 7, wherein the compensation pattern is disposed on or below a central portion of the internal electrode patterns.

10. The method of claim 7, wherein the compensation pattern is formed of the same material as the plurality of dielectric layers.

11. The method of claim 7, wherein in the step of forming the compensation pattern, the plurality of dielectric layers formed with the compensation pattern are stacked.

12. The method of claim 7, wherein in the step of forming the compensation pattern, the compensation pattern is formed on the internal electrode pattern.

13. The method of claim 7, wherein a thickness of a center of the internal electrode pattern is smaller than that of an end thereof.

14. The method of claim 7, wherein a thickness of the compensation pattern is 4 to 13 times as great as that of a dielectric layer among the plurality of dielectric layers.

15. The method of claim 7, wherein in the step of forming the laminate, the compensation pattern contacts at least one of an upper surface and a lower surface of a dielectric layer among the plurality of dielectric layers.

16. The method of claim 7, wherein the laminate includes a plurality of compensation patterns.

* * * * *